United States Patent
Dimanshteyn

(10) Patent No.: US 7,744,783 B2
(45) Date of Patent: Jun. 29, 2010

(54) METHOD OF MAKING NON-FLAMMABLE THERMAL INSULATIION FOAM AND PRODUCTS MADE BY THE METHOD

(76) Inventor: Felix Dimanshteyn, 675 Mountain Rd., West Hartford, CT (US) 06117

( * ) Notice: Subject to any disclaimer, the term of this patent is extended or adjusted under 35 U.S.C. 154(b) by 121 days.

(21) Appl. No.: 11/417,629

(22) Filed: May 4, 2006

(65) Prior Publication Data

US 2007/0257226 A1 Nov. 8, 2007

(51) Int. Cl.
C09K 21/00 (2006.01)
B32B 9/04 (2006.01)
(52) U.S. Cl. ..................... 252/606; 428/446
(58) Field of Classification Search ............. 252/601, 252/606, 607; 428/453
See application file for complete search history.

(56) References Cited

U.S. PATENT DOCUMENTS

| | | | | |
|---|---|---|---|---|
| 4,612,239 A | | 9/1986 | Dimanshteyn | 428/246 |
| 4,748,066 A | * | 5/1988 | Kelly et al. | 428/182 |
| 4,765,885 A | * | 8/1988 | Sadeghi et al. | 208/391 |
| 4,803,022 A | * | 2/1989 | Barrell et al. | 264/491 |
| 4,835,054 A | * | 5/1989 | Scarpa | 428/377 |
| 4,871,477 A | | 10/1989 | Dimanshteyn | 252/609 |
| 4,888,057 A | * | 12/1989 | Nguyen et al. | 106/18.12 |
| 5,035,951 A | | 7/1991 | Dimanshteyn | 428/446 |
| 5,094,780 A | * | 3/1992 | von Bonin | 252/606 |
| 7,045,080 B1 | * | 5/2006 | Youngs | 252/606 |

OTHER PUBLICATIONS

PQ Corporation Bulletin 12-31, "*Bonding and Coating Applications of PQ® Soluble Silicates*", PQ Corporation, Industrial Chemicals Division (2006).

* cited by examiner

*Primary Examiner*—Mark Eashoo
*Assistant Examiner*—Peter F Godenschwager

(57) ABSTRACT

The present invention is directed to a method of preparing non-flammable thermal insulation foam, comprising the steps of (a) providing a mixture comprising (1) at least one water soluble alkali metal silicate, (2) optionally, at least one filler, and (3) at least one inorganic material which releases non-flammable gases when exposed to heat; (b) applying the mixture to a support or mold; and (c) heating the mixture to form the non-flammable thermal insulation foam.

14 Claims, No Drawings

METHOD OF MAKING NON-FLAMMABLE THERMAL INSULATIION FOAM AND PRODUCTS MADE BY THE METHOD

BACKGROUND OF THE INVENTION

1. Field of the Invention

The present invention is directed to foam insulation, and more particularly to a method of making non-flammable thermal insulation foam from water soluble alkali metal silicates and organic materials. The invention is also directed to a method of making nonflammable foam panels made from water soluble alkali metal silicates and filler additives.

2. Brief Description of the Related Art

Thermal insulation is known for use in houses, buildings, pipes, ductwork, and many other applications. The best known thermal insulation for structures is fiberglass insulation, sold commercially by Owens Coming (Toledo, Ohio). Although this thermal insulation is very popular, it possesses a relatively low "R" factor and reduced thermal insulating properties as it absorbs moisture. Fiberglass material may also be a health hazard. Likewise, urea-formaldehyde foam has been used for insulating cavities and structures. However, use of that foam was prohibited because of alleged health hazards.

Polyurethane and other petroleum-based foams have been used for many years and have substantially better R factors as compared to fiberglass insulation. However, petroleum-based foams suffer several disadvantages. First, they are flammable and can give off toxic fumes if burned. Second, since they are made from petroleum products, such materials are generally bad for the environment if they are not disposed of properly.

U.S. Pat. No. 5,035,951 discloses swellable materials that protect against overheating, comprising an aqueous mixture of a water soluble alkali metal silicate, a hydrated metal silicate clay, and an inorganic particulate material which, when exposed to flame temperatures, endothermically releases a nonflammable gas. The sodium and potassium silicates utilized in this coating have softening points of 1200 and 1280° F., and flow points of 1545 and 1660° F., respectively. This composition utilizes clay and other materials that give the composition the ability to withstand temperatures up to 3200-3400° F.

What is needed in the art is a foam insulation that possesses a high "R" value for insulation, that is nontoxic, nonflammable, and that is not bad for the environment. The present invention is believed to be an answer to that need.

SUMMARY OF THE INVENTION

In one embodiment, the present invention is directed to a method of preparing non-flammable thermal insulation foam, comprising the steps of: (a) providing a mixture comprising (1) at least one water soluble alkali metal silicate, (2) at least one inorganic material which releases non-flammable gases when exposed to heat; and (3) optionally, at least one filler; (b) applying the mixture to a support or mold; and (c) heating the mixture to form the non-flammable thermal insulation foam, wherein the heating step is accomplished by an electric or electromagnetic heating device.

In another embodiment, the present invention is directed to a method of preparing non-flammable thermal insulation foam, comprising the steps of: (a) providing a mixture comprising (1) at least one water soluble alkali metal silicate; (2) at least one inorganic material which releases non-flammable gases when exposed to heat; and (3) optionally, at least one filler; (b) applying the mixture to a support or mold; and (c) heating the mixture to form the non-flammable thermal insulation foam, wherein the heating step is accomplished by inherent heat or a heating device powered by gas, oil, or solid fuel.

In yet another embodiment, the present invention is directed to a method of preparing non-flammable panel, comprising the steps of: (a) providing a mixture comprising (1) at least one water soluble alkali metal silicate, (2) optionally, at least one inorganic material which releases non-flammable gases when exposed to heat; and (3) one or more fillers selected from the group consisting of silica; clay; mica; talc; microspheres; microcells; glass; ceramic; chopped fibers; cement; vermiculite; perlite, zinc oxide, zeolite, sodium silicofluoride, sulfate salts, and combinations thereof; (b) applying the mixture to a support or mold; and (c) applying heat or pressure or a combination thereof to the mixture to form the non-flammable panel.

These and other aspects will become apparent upon reading the following detailed description of the invention.

DETAILED DESCRIPTION OF THE INVENTION

It has been unexpectedly discovered that a non-flammable thermal insulation foam may be produced from a mixture comprising one or more water soluble alkali metal silicates and at least one inorganic material which releases non-flammable gasses when heated. The present invention overcomes many of the deficiencies of prior foam insulation materials because it produces foams having high "R" value and is nontoxic. Additionally, the present invention produces foams that are not based on petroleum products and thus do not release undesirable gasses when burned, or are hazardous to the environment.

As indicated above, the present invention is directed generally to a method of preparing non-flammable thermal insulation foam, comprising the steps of (a) providing a mixture comprising (1) at least one water soluble alkali metal silicate, (2) at least one inorganic material which releases non-flammable gases when exposed to heat; and (3) optionally, at least one filler; (b) applying the mixture to a support or mold; and (c) heating the mixture to form the foam. Each of these steps is discussed below.

In order to prepare the non-flammable thermal insulation foam according to the method of the invention, a mixture is first prepared that contains at least one water soluble alkali metal silicate and at least one inorganic material that releases nonflammable gasses when exposed to heat. Alkali metal silicates suitable for use in the method of the invention include sodium silicate and potassium silicate. These materials contain varying ratios of alkali metal component to silicon component depending on the grade of the material. The ratio of the alkali metal component to the silicon component also affects the rate at which water is lost from the material. As a general matter, it is preferable to use water soluble alkali metal silicates that have lower weight ratios and higher alkaline content.

Preferable sodium silicate materials possess weight ratios of $SiO_2$ to $Na_2O$ ranging from 1.6 to 3.75, have weight percents $Na_2O$ ranging from 6.75 to 19.7 based on the total weight of the silicate, and have weight percents of $SiO_2$ ranging from 25.3 to 36, based on the total weight of the silicate. An example of a suitable sodium silicate for use in the method of the invention is a sodium silicate having a weight ratio of $SiO_2$ to $Na_2O$ of 2.40, a weight percent of $Na_2O$ of about 13.9%, and a weight percent of $SiO_2$ of about 33.2%, sold under the tradename "RU" by PQ Corporation, Valley Forge, Pa. Another suitable sodium silicate for use in the method of the invention is a sodium silicate having a weight ratio of $SiO_2$ to $Na_2O$ of 2.00, a weight percent of $Na_2O$ of about 14.7%, and a weight percent of $SiO_2$ of about 29.4%, sold under the tradename "D" by PQ Corporation. Another suitable sodium silicate for use in the method of the invention is a sodium silicate having a weight ratio of $SiO_2$ to $Na_2O$ of 3.22, a weight percent of $Na_2O$ of about 8.9%, and a weight percent of $SiO_2$ of about 28.7%, sold under the tradename "N" by PQ Corporation. Yet another suitable sodium silicate for use in the method of the invention is a sodium silicate having a weight ration of $SiO_2$ to $Na_2O$ of 2, and a weight percent of $Na_2O$ of about 18%, and a viscosity of about 70,000 centipoise, and sold under the tradename "C" by PQ Corporation.

Preferable potassium silicate materials possess weight ratios of $SiO_2$ to $K_2O$ ranging from 2.1 to 2.5, have weight percents $K_2O$ ranging from 8.3 to 12.5 based on the total weight of the silicate, and have weight percents of $SiO_2$ ranging from 20.8 to 26.3, based on the total weight of the silicate.

The above water soluble alkali metal silicates may be used individually in the method of the invention, or may be used in combinations of two, three, four, or more. If more than one silicate is used, any ratio of the individual silicates may be used. For example, in one embodiment, a combination could be made with silicate RU and silicate D described above in a weight ratio ranging from 1:99 to 99:1.

Without being bound by any particular theory, it is believed that sodium and/or potassium silicates with lower weight ratios dehydrate more slowly because their higher alkali content creates a greater affinity for water. At elevated temperatures, a part of the water becomes steam inside the silicates which expands the silicates to create a large number of cells with walls of silicate. At a certain temperature, these walls dehydrate and become solid and make for a structurally stable foam.

At least one inorganic material that releases nonflammable gas when exposed to heat is combined with the above water soluble alkali metal silicates in order to aid in creation of the foam by creating water vapor, or to improve the physical properties of the foam. Useful inorganic materials include, but are not limited to, sodium tetraborate; hydrated borate salts such as sodium metaborate. The amount of inorganic material used in the mixture according to the method of the invention is preferably from about 0.1 to about 60 percent by weight, based on the total weight of the mixture, and more preferably from about 10 to about 30, based on the total weight of the mixture.

Fillers may be optionally added to improve the physical and thermal properties of the foams and structures made from the foams, such as panels. Useful fillers include silica, including fumed silica and precipitated silica; clays; mica; talc; solid or hollow microspheres; solid or hollow microcells; fillers, such as glass, ceramic, or silica; chopped fibers, cement; vermiculite; perlite, zinc oxide, zeolite, sodium silicofluoride, sulfate salts, and the like. In addition, structural elements, such as metal screens or nonmetal scrims, may also be included as fillers in the developed foams. As will be appreciated by those of skill in the art, combinations of any of the above filler materials may also be implemented in the method of the invention. The amount of additional fillers used in the mixture according to the method of the invention is preferably from about 1 to about 70 percent by weight, based on the total weight of the mixture, and more preferably from about 20 to about 50, based on the total weight of the mixture.

The water soluble alkali metal silicate and the inorganic material are combined using any method that produces a homogeneous mixture, and the resulting mixture can be applied to a substrate in a liquid state, in a partially dry state, or in a dry state in the form of powders or particles. Liquid states are advantageous if an even thickness of foam is desired. Powder or particle forms are useful when using molds or containers to form the foam according to the method of the invention. Under heat and pressure, the powders will take any form and shape, such as panels, pipes or any other configuration. In addition, water can be partially preliminarily vaporized to produce a partially dry mixture. As defined herein, partially dry states include less than the normally occurring amount of water, but are not completely free of water. Preliminary vaporization to achieve a partially dry state can occur prior to or after applying the mixture to a support or mold.

The above mixture is applied to a support or placed in a mold prior to heating. The choice of support or mold depends on the particular application for which the insulation foam is being used. In one embodiment, the support is a material with a surface onto which the above mixture is applied. Examples of supports useful in the method of the present invention include metal sheets, foils, or pipes made from aluminum, copper, steel, and the like; metal screens that are electrically or thermally conductive; paper, cardboard, or fiberboard; ceramics, cements, wood or plywood, woven or nonwoven fiberglass, mat fiberglass, glass, sheetrock, and the like. In one embodiment, the support is a building material such as plywood or sheetrock so that an insulated panel is produced according to the method of the invention. The above mixture may also be placed in a mold to form a thermal insulation foam having a desired shape. The mold may be any shape appropriate for thermal foam insulation. For example, the mixture can be sandwiched between two support layers, or made into a hollow sleeve for application to the outside of pipes, tubes, and the like. The material may also be formed into panels by forming the foam between heated rollers, as known in the art. Electrically or thermally conductive screens or wires may also be embedded in the material, and then activated to generate heat and form the desired foam.

The amount of foam mixture applied to the support or mold according to the method of the invention is largely based on the desired application and degree of foam production for the selected foam mixture. In general, the volume of the foam formed from the mixture can be up to approximately twenty times the volume of the mixture itself. In practice, preferred amounts of mixture range from about 0.01 mm to 6 cm in thickness prior to heating, which can result in a foam with thicknesses ranging from up to 0.2 mm to 120 cm.

The mixture that has been applied to a support or mold is then heated to produce the thermal insulation foam. The temperature at which the foam is created generally varies depending on factors such as the composition of the above mixture, the method of heat delivery, the nature of the support, the length of time heat is applied, and the like. In general, the heating step preferably takes place in a temperature range from about 100° F. to about 2500° F., more preferably from about 150° F. to about 1800° F., and most preferably from about 200° F. to about 1500° F. As will be appreciated by one of skill in the art, the selected temperature for a particular mixture will depend on a variety of factors, including the method of heating, the composition of the mixture, the amount of mixture present, the desired application, and the like. In addition, the heat required to make the foam according to the method of the invention can be applied by any heating device or method without limitation, such as a furnace or oven powered by gas, oil, solid fuels, electricity, microwaves, electromagnetic sources, or infrared irradiation; torch; electric heating gun, hotplate, and the like. Additionally, the heating step can take place by heating the support or mold directly, or placing the support and mixture inside the heating device. The application of heat preferably ranges from several minutes to several hours or days, depending on the composition of the mixture and the heat source.

The heating step can take place in a variety of ways. For example, in one embodiment, the silicate mixture is applied to a metal sheet as a support, and the metal sheet is heated on a hotplate to approximately 1400° F. In another embodiment, the silicate mixture is applied to a support, and placed in an oven at a temperature that produces the insulation foam. In yet another embodiment, the support is an electrically or thermally conductive screen or wires which are immersed in the mixture, and electricity or heat is applied to the screen or wires to heat the mixture and generate the foam. In yet another embodiment, the mixture is applied to hot pipes and the inherent heat of the pipes causes direct generation of the insulation foam. As defined herein, the phrase "inherent heat" refers to the heat applied to the pipe as a result of hot fluid flowing through it.

Creation of the insulation foam according to the method of the invention can occur without application of pressure, or, alternatively, pressure may be applied during heating of the foam. In some applications, application of pressure during the formation of the insulation foam improves the physical properties of the foam such as strength. The creation of pressure may be due to the confines of the mold or container as the foam is generated, or may be applied externally, for example with a press, heated rollers, and the like. In one embodiment, foam produced between two layers of support layers (e.g., sheetrock) can create pressure that improves the foam strength.

Non-flammable panels may also be made according to the method of the invention. In this embodiment, the above water soluble alkali metal silicates are combined with one or more additives and optional fillers in the absence of the above inorganic material and processed as described above.

The nonflammable foam produced by the method of the invention is useful for a variety of insulation tasks, for example, in constructing homes and buildings, insulating pipes, containers, or any other application where an insulative material is required. Preferred embodiments of implementing the method of the invention are as follows:

(a) Sodium and/or potassium silicate in liquid state with or without additives and with or without fillers can be placed on support layers or in a mold where heat treatment can be applied to create a thermal insulation foam.

(b) Sodium and/or potassium silicate with or without additives and with or without fillers can be placed on support layers or in a mold and partially preliminary vaporized. Heat treatment can then be applied to create a thermal insulation foam.

(c) Sodium and/or potassium silicate in liquid state with or without additives and with or without fillers and optionally preliminary vaporized, can be placed on hot surfaces such as hot pipes, furnaces and other. In this case heat from pipes, furnaces will create a thermal insulation foam which will provide thermal protection. In these cases, creation of foam does not require additional heat treatment.

(d) Sodium and/or potassium silicate with or without additives or with or without fillers can be made in form of powders or particles, and placed in any mold or container, or on any support layer. Under heat and pressure, these powders or particles will take any form and shape, such as panels, pipes or any other selected configuration.

The following examples are intended to illustrate, but in no way limit the scope of the present invention. All parts and percentages are by weight, and temperatures are in degrees Celsius unless explicitly stated otherwise.

EXAMPLES

Example 1

A mixture of 120 grams that consisted of 70 grams of sodium silicate grade RU (PQ Corporation, Valley Forge, Pa.), 30 grams of sodium silicate grade N (PQ Corporation) and 20 grams borax (sodium tetraborate) was prepared and applied to an aluminum foil sheet at about $\frac{1}{8}^{th}$ inch thick. The coated foil was placed on a steel plate which was heated to about 1050° F. on a hotplate. The developed foam had a thickness of approximately 1.5 inch.

Example 2

The same formulations and procedures were used as described in Example 1 above, except the steel plate was heated in an electric furnace at about 650° F. The formed foam had a thickness of approximately 1.5 inch.

Example 3

100 grams of sodium silicate grade RU (PQ Corporation) was combined with 20 grams of borax, and spread on to paper 15 mil thick. This coated paper was placed in a microwave oven for 5.5 minutes (60 Hz, 12.1 amps, 120 Volts). The developed foam was about 8 inches in diameter and 2.5 inches thick.

Example 4

The same formulations and procedures were used as described in Example 3 above, except a 2 inch restriction was placed over the foam so that the developed foam was approximately 8 inches in diameter and 2 inches thick.

Example 5

The same formulations and procedures were used as described in Examples 1 and 3 above, except a preliminary drying step (100° F. for 24 hrs) was performed prior to placing the coated paper in the microwave oven. The coated paper was then placed in the microwave oven for 3.5 minutes to develop a foam that was approximately 8 inches in diameter and 2 inches thick.

Example 6

100 grams of sodium silicate Grade D (PQ Corporation) was mixed with 20 grams borax, and the mixture was spread on a paper sheet about 15 mils thick. A non-woven fiberglass sheet was placed on top of the spread mixture, and was subjected to preliminary vaporization by letting the material sit at room temperature for 24-48 hours. The material was then placed in a microwave oven (60 Hz, 12.1 amps, 120 Volts) and heated for 4.3 minutes to develop a foam which was about 7×7.5 inch and about 1.75 inch thick.

While the invention has been described above with reference to specific embodiments thereof, it is apparent that many changes, modifications, and variations can be made without departing from the inventive concept disclosed herein. Accordingly, it is intended to embrace all such changes, modifications, and variations that fall within the spirit and broad scope of the appended claims. All patent applications, patents, and other publications cited herein are incorporated by reference in their entireties.

What is claimed is:

1. A method of preparing non-flammable thermal insulation foam, comprising the steps of:
   (a) providing a liquid mixture comprising
      (1) at least one water soluble alkali metal silicate selected from the group consisting of sodium silicate, potassium silicate, and combinations thereof, and wherein said sodium silicate has a weight ratio of $SiO_2$ to $Na_2O$ ranging from about 1.6 to about 3.22, and wherein said potassium silicate has a weight ratio of $SiO_2$ to $K_2O$ ranging from 2.1 to 2.5,
      (2) at least one inorganic material which releases non-flammable gases when exposed to heat; and
      (3) at least one filler selected from the group consisting of silica; mica; talc; microspheres; microcells; glass; ceramic; chopped fibers; cement; perlite; zinc oxide and zeolite;
   (b) applying said mixture in a liquid state on a support layer or in between support layers;
   (c) placing said support layer or support layers into or onto a heating device which provides a temperature of between 450 and 1750° F. to the support layer or support layers and where heat is applied to said liquid mixture to form a foam.

2. The method of claim 1, wherein said inorganic material is selected from the group consisting of sodium tetraborate and hydrated borate salts.

3. The method of claim 1, wherein said support layer or support layers are selected from the group consisting of pipes, paper, cardboard, fiberboard, ceramics, cement, wood, woven or non-woven fiberglass, mat fiberglass, glass, sheetrock, metal sheets, foils, and metal screens.

4. The method of claim 1, wherein said heating device is selected from the group consisting of an electric or electromagnetic furnace or oven, microwaves, hot plate, or heating device powered by gas, oil, or solid fuel.

5. A method of preparing non-flammable thermal insulation foam, comprising the steps of:
   (a) providing a liquid mixture comprising
      (1) at least one water soluble alkali metal silicate selected from the group consisting of sodium silicate, potassium silicate, and combinations thereof, and wherein said sodium silicate has a weight ratio of $SiO_2$ to $Na_2O$ ranging from about 1.6 to about 3.22, and wherein said potassium silicate has a weight ratio of $SiO_2$ to $K_2O$ ranging from 2.1 to 2.5,
      (2) silica selected from the group consisting of fumed silica, precipitated silica, and combinations thereof; and
      (3) at least one filler selected from the group consisting of silica; mica; talc; microspheres; microcells; glass; ceramic; chopped fibers; cement; perlite; zinc oxide and zeolite;
   (b) applying said mixture in a liquid state on a support layer or in between support layers;
   (c) placing said support layer or support layers into or onto a heating device which provides a temperature of between 450 and 1750° F. to the support layer or support layers and where heat is applied to said liquid mixture to form a foam.

6. The method of claim 5, wherein said support layer or support layers are selected from the group consisting of pipes, paper, cardboard, fiberboard, ceramics, cement, wood, woven or non-woven fiberglass, mat fiberglass, glass, sheetrock, metal sheets, foils, and metal screens.

7. The method of claim 5, wherein said heating device is selected from the group consisting of an electric or electromagnetic furnace or oven, microwaves, hot plate, or heating device powered by gas, oil, or solid fuel.

8. A method of preparing non-flammable thermal insulation foam, comprising the steps of:
   (a) providing a liquid mixture comprising
      (1) at least one water soluble alkali metal silicate selected from the group consisting of sodium silicate, potassium silicate, and combinations thereof, and wherein said sodium silicate has a weight ratio of $SiO_2$ to $Na_2O$ ranging from about 1.6 to about 3.22, and wherein said potassium silicate has a weight ratio of $SiO_2$ to $K_2O$ ranging from 2.1 to 2.5,
      (2) at least one filler selected from the group consisting of silica; mica; talc; microspheres; microcells; glass; ceramic; chopped fibers; cement; perlite; zinc oxide and zeolite;
   (b) applying said mixture in a liquid state on a support layer or in between support layers;
   (c) placing said support layer or support layers into or onto a heating device which provides a temperature of between 450 and 1750° F. to the support layer or support layers and where heat is applied to said liquid mixture to form a foam.

9. The method of claim 8, wherein said support layer or support layers are selected from the group consisting of pipes, paper, cardboard, fiberboard, ceramics, cement, wood, woven or non-woven fiberglass, mat fiberglass, glass, sheetrock, metal sheets, foils, and metal screens.

10. The method of claim 8, wherein said heating device is selected from the group consisting of an electric or electromagnetic furnace or oven, microwaves, hot plate, or heating device powered by gas, oil, or solid fuel.

11. A method of preparing non-flammable thermal insulation foam, comprising the steps of:
    (a) providing a liquid mixture comprising
       (1) at least one water soluble alkali metal silicate selected from the group consisting of sodium silicate, potassium silicate, and combinations thereof, and wherein said sodium silicate has a weight ratio of $SiO_2$ to $Na_2O$ ranging from about 1.6 to about 3.22, and wherein said potassium silicate has a weight ratio of $SiO_2$ to $K_2O$ ranging from 2.1 to 2.5,
       (2) at least one inorganic material which releases non-flammable gases when exposed to heat; and
       (3) at least one filler selected from the group consisting of silica; mica; talc; microspheres; microcells; glass; ceramic; chopped fibers; cement; perlite; zinc oxide and zeolite;
    (b) applying said mixture in a liquid state in a mold or in between rollers;
    (c) placing said mold or rollers into or onto a heating device which provides temperatures of between 450 and 1750° F. inside the mold or space between rollers and where heat is applied to said liquid mixture to form a foam.

12. The method of claim 11, wherein said heating device is selected from the group consisting of an electric or electromagnetic furnace or oven, microwaves, hot plate, or heating device powered by gas, oil, or solid fuel.

13. A method of preparing non-flammable thermal insulation foam, comprising the steps of:
    (a) providing a liquid mixture comprising
       (1) at least one water soluble alkali metal silicate selected from the group consisting of sodium silicate, potassium silicate, and combinations thereof, and wherein said sodium silicate has a weight ratio of $SiO_2$ to $Na_2O$ ranging from about 1.6 to about 3.22, and wherein said potassium silicate has a weight ratio of $SiO_2$ to $K_2O$ ranging from 2.1 to 2.5, (2) at least one filler selected from the group consisting of silica; mica; talc; microspheres; microcells; glass; ceramic; chopped fibers; cement; perlite; zinc oxide and zeolite;

(b) applying said mixture in a liquid state in a mold or in between rollers;

(c) placing said mold or rollers into or onto a heating device which provides temperatures of between 450 and 1750° F. inside the mold or space between rollers and where heat is applied to said liquid mixture to form a foam.

14. The method of claim 13, wherein said heating device is selected from the group consisting of an electric or electromagnetic furnace or oven, microwaves, hot plate, or heating device powered by gas, oil, or solid fuel.

\* \* \* \* \*